United States Patent
Park et al.

(10) Patent No.: US 9,042,464 B2
(45) Date of Patent: May 26, 2015

(54) 500 MBPS TRANSMISSION APPARATUS USING 2P LINE

(75) Inventors: Hyung-Jin Park, Daejeon (KR);
Jae-Hyoung Park, Daejeon (KR); Hae Chung, Anyang-si (KR); Jin-Hee Kim, Daejeon (KR); Dong Won Lee, Gumi-si (KR); Seong-Bae Jeon, Gumi-si (KR)

(73) Assignee: KT Corporation, Seongnam-Si (KR)

( * ) Notice: Subject to any disclaimer, the term of this patent is extended or adjusted under 35 U.S.C. 154(b) by 65 days.

(21) Appl. No.: 13/997,510

(22) PCT Filed: Nov. 23, 2011

(86) PCT No.: PCT/KR2011/008971
§ 371 (c)(1),
(2), (4) Date: Jun. 24, 2013

(87) PCT Pub. No.: WO2012/086933
PCT Pub. Date: Jun. 28, 2012

(65) Prior Publication Data
US 2013/0287128 A1    Oct. 31, 2013

(30) Foreign Application Priority Data
Dec. 24, 2010 (KR) .................. 10-2010-0134505

(51) Int. Cl.
| | | |
|---|---|---|
| H04B 3/02 | (2006.01) |
| H04L 12/931 | (2013.01) |
| H04L 25/05 | (2006.01) |
| H04L 25/14 | (2006.01) |
| H04L 25/49 | (2006.01) |
| H04L 12/28 | (2006.01) |
| H04L 1/00 | (2006.01) |
| H04L 5/14 | (2006.01) |
| H04L 12/825 | (2013.01) |

(52) U.S. Cl.
CPC ........ *H04B 3/02* (2013.01); *H04L 49/40* (2013.01); *H04L 5/1423* (2013.01); *H04L 25/05* (2013.01); *H04L 25/14* (2013.01); *H04L 25/4919* (2013.01); *H04L 12/2801* (2013.01); *H04L 1/0067* (2013.01); *H04L 47/266* (2013.01)

(58) Field of Classification Search
CPC .................................................. H04L 1/0067
USPC ........................................................ 375/257
See application file for complete search history.

(56) References Cited

U.S. PATENT DOCUMENTS

| | | | |
|---|---|---|---|
| 2004/0246953 A1 | 12/2004 | Muth et al. | |
| 2007/0058680 A1 | 3/2007 | Choi et al. | |
| 2010/0260498 A1 | 10/2010 | Kim et al. | |
| 2010/0322105 A1* | 12/2010 | Diab | 370/254 |
| 2012/0106345 A1* | 5/2012 | Diab | 370/236 |

FOREIGN PATENT DOCUMENTS

| | | |
|---|---|---|
| KR | 10-2001-0047753 A | 6/2001 |
| KR | 10-2010-0037739 A | 4/2010 |

OTHER PUBLICATIONS

International Search Report mailed May 1, 2012.

* cited by examiner

*Primary Examiner* — Michael Neff
(74) *Attorney, Agent, or Firm* — Sughrue Mion, PLLC (57) ABSTRACT

A 500 Mbps transmission apparatus is provided. The apparatus uses a 2P line which is capable of providing a 500 megabits-per-second service via a 2P UTP cable by adding a sub-layer which serializes and de-serializes symbols which have rates matched with each other and are synchronized, while maintaining a 1000BASE-T unique hierarchical architecture.

14 Claims, 7 Drawing Sheets

500 MBPS TRANSMISSION APPARATUS USING 2P LINE

CROSS-REFERENCE TO RELATED APPLICATIONS

This application is a national stage entry of PCT/KR2011/008971, filed on Nov. 23, 2011, which claims priority from Korean Patent Application No. 10-2010-0134505, filed on Dec. 24, 2010 in the Korean Intellectual Property Office, the disclosures of which are incorporated herein by reference in their entireties.

BACKGROUND

1. Technical Field

Exemplary embodiments relate to a 500 Mbps transmission apparatus using a 2P line, and more particularly, to a 500BASE-T transmission apparatus which is capable of providing a 500 megabits-per-second service via a 2P UTP cable based on 1000BASE-T.

2. Related Art

An image quality of an ultra definition television (UDTV) is at least four times and at most 16 times higher than that of a high definition television (HDTV). This means that the UDTV must transmit data at a transmission rate of 4 to 16 times higher than that of the HDTV. In addition, as a three-dimensional (3D) image is spotlighted, there is a need to transmit the UDTV image and a 3D image via an Internet Protocol television (IPTV). At present, however, a maximum transmission rate which can be supplied to a home via an unshielded twisted pair (UTP), which is 100 Mbps in an Ethernet transmission technology, is insufficient for simultaneously providing the service to a plurality of channels.

Various fiber-to-the-home (FTTH) technologies which can be used to smoothly provide the service may be easily installed in recently built residential districts or newly built residential districts, but may not be easily installed in older residential districts. Further, with respect to cost, the FTTH technologies still faces situations relating to using the UTP.

Until now, the use of 1000BASE-T as a technology for exceeding a data rate of 100 megabits per second from among the transmission technologies utilizing the UTP has been relatively effective. The 1000BASE-T is a technology of enabling data to be transmitted at a data rate of 1 Gbps through the UTP of four pairs (4P) as the IEEE 802.3ab standard. There is a problem in that when reviewing the UTP conditions in most residential districts in the nation, the UTP is configured to have two pairs (2P) or less. In these districts, the 1000BASE-T facilitates the 100 megabit-per-second Ethernet service using the 2P UTP, but has a problem in providing 1 gigabit-per second Ethernet using the 4P UTP.

In order to solve the above problem, there is a need to additionally install a new 2P UTP, which may cause difficulties with respect to implementing local cabling and also cause additional costs.

Further, an ultra broadband convergence network (UBcN) is a broadcasting and telecommunication network advancing plan which provides a transmission rate of up to 1 Gbps in a wired field and up to 10 Mbps in a wireless field. In order to provide a 1 gigabit-per-second service in the wired field, a FTTH-real (R) scheme which directly connects an optical cable into a house of a subscriber and a FTTH-E scheme which uses the 1000BASE-T technology of connecting the UBcN to a terminal box of an apartment with the optical cable and connecting the UBcN into the subscriber terminal with the UTP can be used.

With respect to the UBcN, in order to implement a transmission rate exceeding 100 Mbps via the UTP, a digital subscriber line (DSL) technology may not be selected. The reason is that even the very high bit rate DSL (VDSL) which provides the highest transmission rate has a data rate of 100 Mbps or less. Therefore, a gigabit-per-second Ethernet is the only suitable alternative which may be selected.

Because the use of Ethernet technology has greatly increased since being introduced for office automation, the Ethernet technology has been widely used even for a campus, a workplace, and a general home. As a transfer medium, a coaxial cable, a UTP, and an optical cable have been used. Among those, data rates with respect to a technology of utilizing the UTP start from 10 Mbps and increase up to as high as 1 Gbps via 100 Mbps.

10BASE-T is compatible with 100BASE-T and the 100BASE-T is compatible with the 1000BASE-T, but the 1000BASE-T is fundamentally applied with other technologies. In particular, by comparison with 100 Mbps, the 1000BASE-T does not simply increase the transmission rate of a symbol but maintains the same board rate of 125 MHz while using a quinary signal without using a binary data format. Further, the technology of utilizing the UTP includes using the 4P and simultaneously performs transmission and reception (i.e., bidirectional transmission of data) per 1P in order to transmit 250 Mbps per 1P, thereby generally transmitting at a data rate of 1 Gbps.

The gigabit-per-second Ethernet needs the UTP cable of 4P, but may provide only the service at a data rate of 10 Mbps or 100 Mbps, because the 2P UTP cable is currently laid in most residential districts.

Consequently, the UBcN is not easily provided to most residential districts, including many apartment buildings, until the FTTH-R is used. Due to the additional installment of the UTP, the cost of construction may be expensive, the construction period may be long, and the introduction of service may be delayed.

Therefore, a need exists for a new technology which is capable of providing the UBcN service by using the UTP of 2P.

SUMMARY

Exemplary embodiments described below provide a 500 Mbps transmission apparatus for use in conjunction with the use of a 2P line, which apparatus is capable of providing a 500 megabit-per-second service via a 2P UTP cable by adding sub-layer serializing and de-serializing symbols which have matching rates and are synchronized, while maintaining a 1000BASE-T unique hierarchical architecture.

In one aspect according to one or more exemplary embodiments, there is provided a 500 Mbps transmission apparatus for use in conjunction with a 2P line, including: a rate matcher which is configured to match rates of transmission data by mapping transmission data which is received from a gigabit media independent interface (GMII) to 0.5 GMII; and a data converter which is configured to generate four symbol vectors by using the transmission data for which the rates are matched, and to generate reception data by using four symbol vectors which have been parallelized by a symbol vector processor, wherein the symbol vector processor is configured to serialize the four symbol vectors generated by the data converter into two symbol vectors and to de-serialize the two symbol vectors received from a transceiver into the four symbol vectors; and the transceiver transmits the two symbol vectors serialized by the symbol vector processor to a hybrid circuit and transmits the two symbol vectors received from the hybrid circuit to the symbol vector processor.

As set forth above, the exemplary embodiments can provide a 500 megabit-per-second service via a 2P UTP cable by adding the sub-layer which serializes and de-serializes the symbols which have the rates matched with each other and are synchronized, while maintaining the 1000BASE-T unique hierarchical structure.

Further, according to the exemplary embodiments, the 500BASE-T technology which provides the 500 megabit-per-second service via the 2P UTP can be completely compatible with the gigabit media independent interface (GMII) by adding the sub-layer without changing the 1000BASE-T technology.

Further, according to the exemplary embodiments, the 500BASE-T can be converted into the 250BASE-T technology which can transmit the data at a rate of 250 megabits per second per 1P.

Further, according to the exemplary embodiments, because the 2P 500 megabit-per-second transmission scheme or the 1P 250 megabit-per-second transmission scheme provides a transmission rate which is capable of transmitting the plurality of 3DTV channels or the plurality of UDTV channels to be described below and is very advantageous in terms of the technology providing cost, either of the 2P 500 megabit-per-second transmission scheme or the 1P 250 megabit-per-second transmission scheme is expected to be positively adopted in the UBcN business which may be promoted by one or more governments, and thus can be utilized for a considerable period of time.

Further, according to the exemplary embodiments, the UBcN service can be provided by the FTTH-E scheme, thereby saving costs as compared with the FTTH-R.

BRIEF DESCRIPTION OF THE DRAWINGS

The above and other aspects of the exemplary embodiments will be more apparent from the following detailed description taken in conjunction with the accompanying drawings, in which.

DETAILED DESCRIPTION OF EXEMPLARY EMBODIMENTS

Hereinafter, exemplary embodiments will be described in detail with reference to the accompanying drawings.

Figure 1:
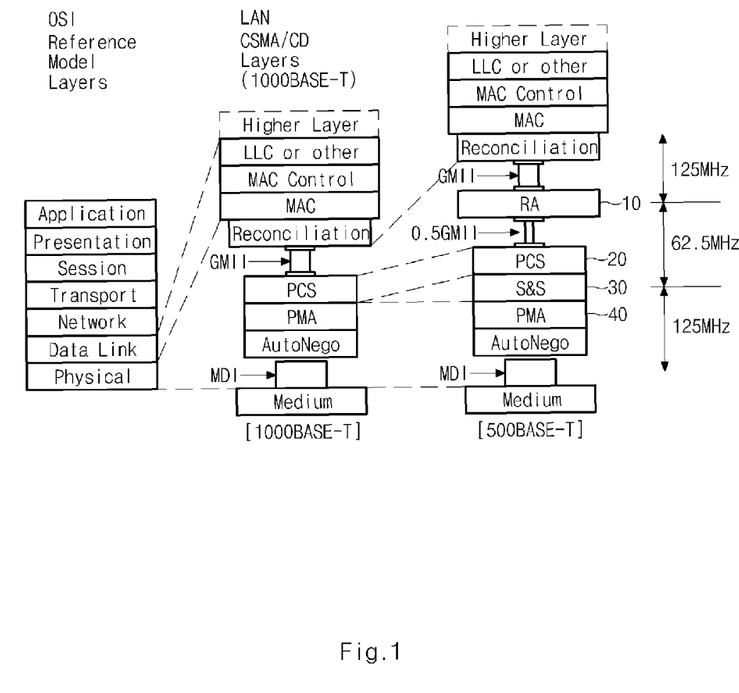
FIG. 1 is an overall configuration diagram illustrating a 500 Mbps transmission apparatus for use in conjunction with a 2P line, according to an exemplary embodiment.

FIG. 1 is an overall configuration diagram of a 500 Mbps transmission apparatus for use in conjunction with a 2P line, according to an exemplary embodiment, which diagram illustrates a 500BASE-T hierarchical architecture based on a 1000BASE-T layer.

As illustrated in FIG. 1, in the 500 Mbps transmission apparatus for use in conjunction with a 2P line according to the exemplary embodiment, a rate adaptation (RA) sub-layer 10 is located between a gigabit media independent interface (GMII) and a Physical Coding Sublayer (PCS) layer 20 which are present in the 1000BASE-T, and a serializer/de-serializer (SerDes) & synchronization (S & S) sub-layer 30 is located between the PCS layer 20 and a Physical Medium Attachment (PMA) layer 40, which maintains the 1000BASE-T unique hierarchical architecture.

The RA sub-layer 10 is a sub-layer which changes a signal (i.e., transmission data) which is received from the GMII to 0.5 GMII and performs a rate matching function. The reason is that because data at a rate of 250 Mbps is transmitted to each 1P with UTP of 2P, and therefore, 1000 Mbps needs to be reduced to 500 Mbps.

Figure 2:
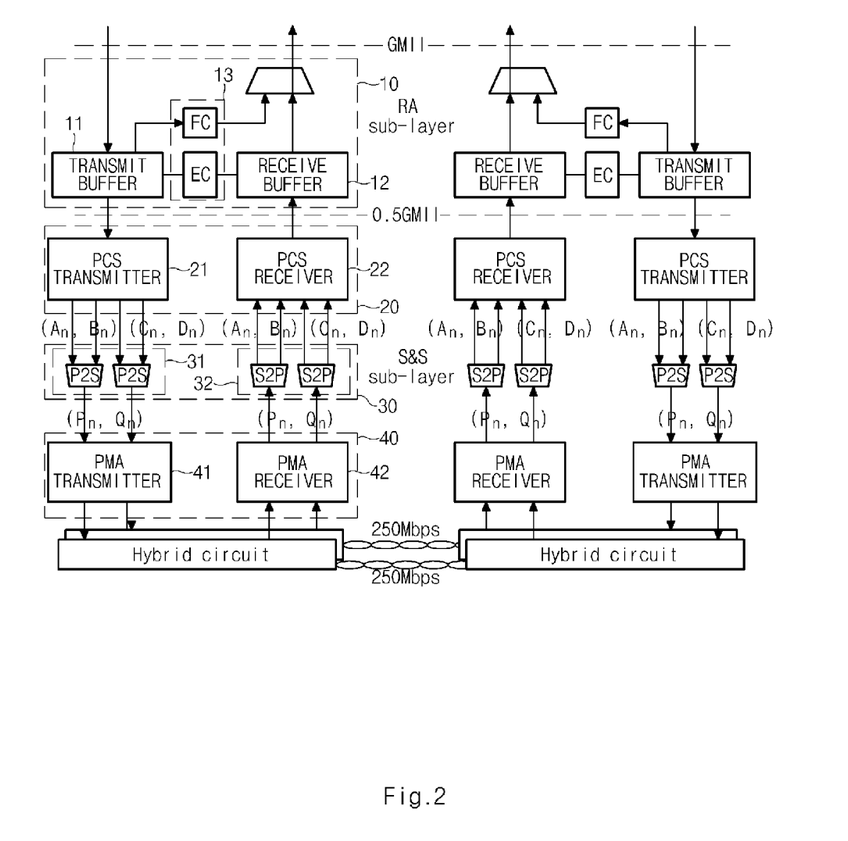
FIG. 2 is a detailed configuration diagram illustrating the 500 Mbps transmission apparatus for use in conjunction with a 2P line, according to an exemplary embodiment.

Referring also to FIG. 2, the S & S sub-layer 30 serializes four symbol vectors $A_n$, $B_n$, $C_n$, and $D_n$ which are received from the PCS layer 20 into two symbol vectors $P_n$ and $Q_n$ and, conversely, de-serializes the two symbol vectors which are received from the PMA layer 40 into four original symbol vectors. The process is performed by synchronization. Herein, the reason for serializing the four symbol vectors into the two symbol vectors is to transmit the four symbol vectors by using the UTP of 2P.

FIG. 2 is a detailed configuration diagram of the 500 Mbps transmission apparatus for use in conjunction with a 2P line, according to an exemplary embodiment.

As illustrated in FIG. 2, first, the RA sub-layer (i.e., the rate matcher) 10 includes a transmit buffer 11, a receive buffer 12, and a controller 13.

The controller 13 stores transmission data TXS<7:0> which is received from the GMII in the transmit buffer 11 in order to reduce a data rate of 1 Gbps to 500 Mbps. The transmit buffer 11 has a length which is sufficient for buffering a frame which is received at a rate of 1 Gbps, and may be implemented using a dual-ported random access memory (DPRAM) or a first-in-first-out (FIFO) configuration. In this configuration, as a rate for storing the transmission data in the transmit buffer 11, a clock of 125 MHz is used, and as a rate for transmitting the frame from the transmit buffer 11, a clock of 62.5 MHz is used.

The controller 13, in an exemplary embodiment, does not simply change the clock, but performs an enable control (EC) in order to increase efficiency of a line. In particular, the controller 13 does not map an inter frame gap (IFG) of an Ethernet frame which is received from the GMII to 0.5 GMII, but instead performs effective rate decoupling at 500 Mbps by minimizing a length of the IFG when transmitting the Ethernet frame with the 0.5 GMII. The description thereof will be described below in detail.

The controller 13 receives reception data RXD<7:0> of the 0.5 GMII at a clock of 62.5 MHz from a PCS receiver 22, and temporarily stores the received data in the receive buffer 12 and then transmits the stored data at a clock rate of 125 MHz to the GMII. In this case, the controller 13 reads a counter, and when there is one or more frame, transmits the frame, attaches a preamble thereto, and controls the length of the IFG to meet a standard of the GMII.

The controller 13 transmits a pause frame in order to request a pause of data transmission to a transmission side when an extra space of the transmit buffer 11 exceeds a threshold value.

Next, the PCS layer (i.e., the data converter) 20 includes a PCS transmitter 21 and the PCS receiver 22 and thoroughly follows a function as suggested in a standard of the 1000BASE-T.

The PCS transmitter 21 generates code groups $A_n$, $B_n$, $C_n$, and $D_n$ to be transmitted to the S & S sub-layer 30 via 'PMA_UNIT_DATA.request' at each symbol period. In particular, the PCS transmitter 21 codes the transmission data TXD<7:0> with the four quinary symbol vectors An, Bn, Cn, and Dn by using a 4D-pulse amplitude modulation 5 (4D-PAM5) technique. In this case, the preamble is substituted into a start stream delimiter (SSD). Further, because the processing rate needs to be operated at 62.5 MHz, an original symbol period is changed from 8 ns to 16 ns.

The PCS transmitter 21 includes a 'SEND_Z' mode which transmits a zero vector to the S & S sub-layer 30, a training mode SEND_I which transmits an idle signal, and a normal mode SEND_N which transmits and receives data, as three operation modes.

The PCS receiver 22 receives the code groups $A_n$, $B_n$, $C_n$, and $D_n$ via the 'PMA_UNIT_DATA.Indication' from the S & S sub-layer 30 and generates receive data RXD<7:0> by using the inverse transform table (not illustrated in the drawings).

Next, the S & S sub-layer (i.e., the symbol vector processor) 30 includes a 4D-to-2D serializer 31 which serializes the four symbol vectors $A_n$, $B_n$, $C_n$, and $D_n$ which are received from the PCS layer 20 into the two symbol vectors $P_n$ and $Q_n$ and a 2D-to-4D de-serializer 32 which de-serializes the two symbol vectors which are received from the PMA layer 40 into the four original symbol vectors.

Next, the PMA layer (i.e., the communication unit or transceiver) 40 includes a PMA transmitter 41 and a PMA receiver 42.

The PMA transmitter 41 receives the two symbol vectors from the 4D-to-2D serializer 31 of the S & S sub-layer 30 and transmits the received two symbol vectors to two hybrid circuits, respectively.

The PMA receiver 42 receives the two symbol vectors from the two hybrid circuits and transmits the received two symbol vectors to the 2D-to-4D de-serializer 32 of the S & S sub-layer 30.

Other functions are the same as the function in the 1000BASE-T.

Finally, the hybrid circuit performs bidirectional transmission and reception at 250 Mbps per 1P by using the UTP of 2P.

Hereinafter, the controller 13 of the RA layer 10 will now be described in more detail with reference to FIGS. 3, 4, and 5.

Figure 3:
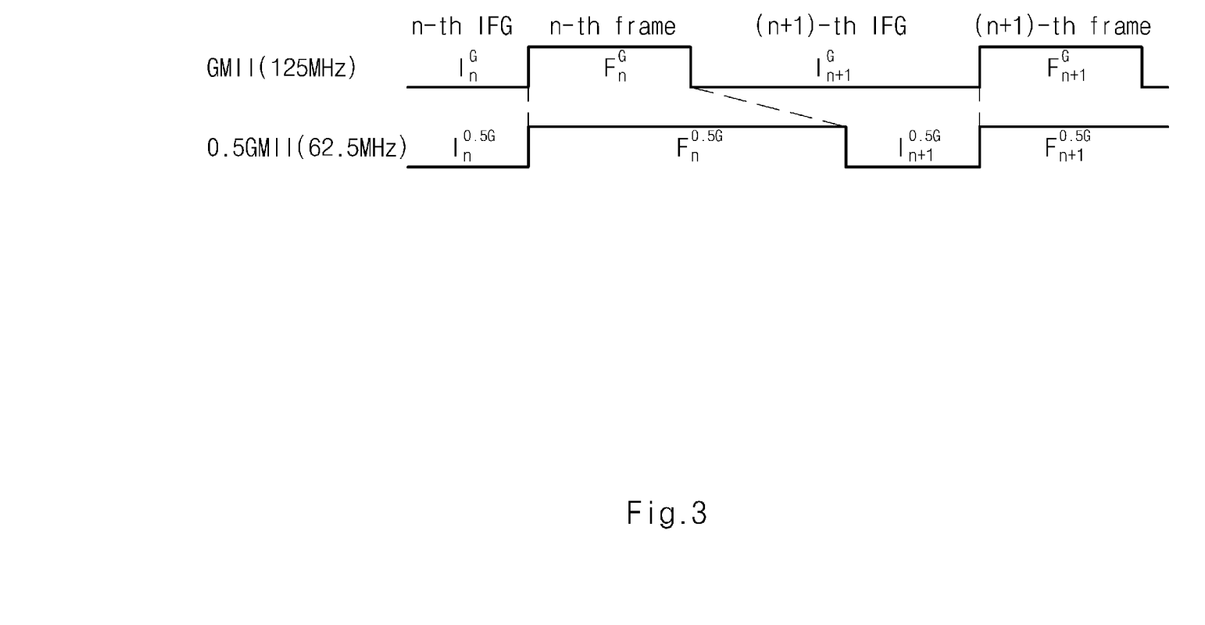
FIG. 3 is a diagram illustrating a process of mapping TX_EN (transmit enable) of GMII to 0.5 GMII, according to an exemplary embodiment.
Figure 4:
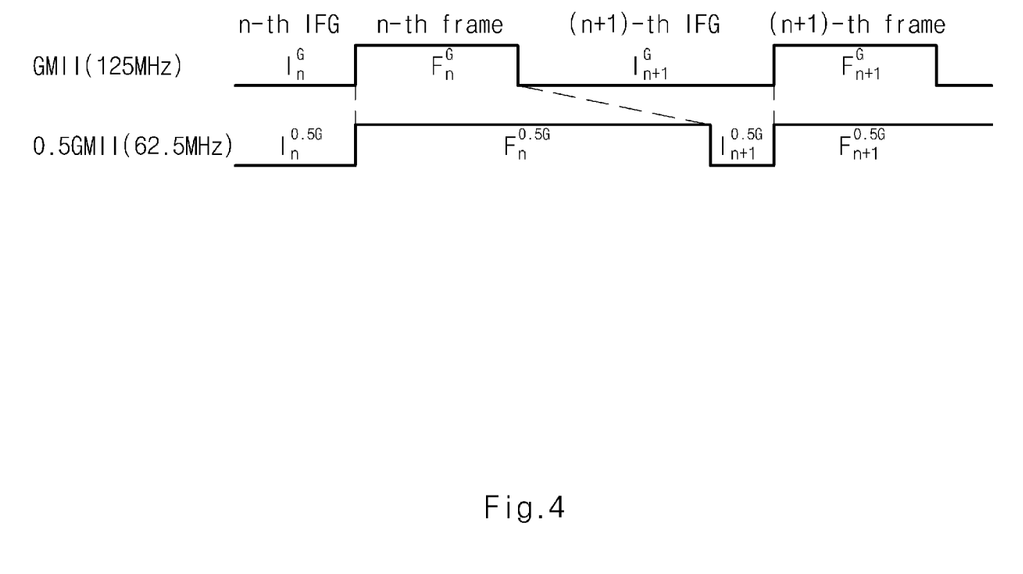
FIG. 4 is another diagram illustrating a process of mapping TX_EN (transmit enable) of GMII to 0.5 GMII, according to an exemplary embodiment.
Figure 5:
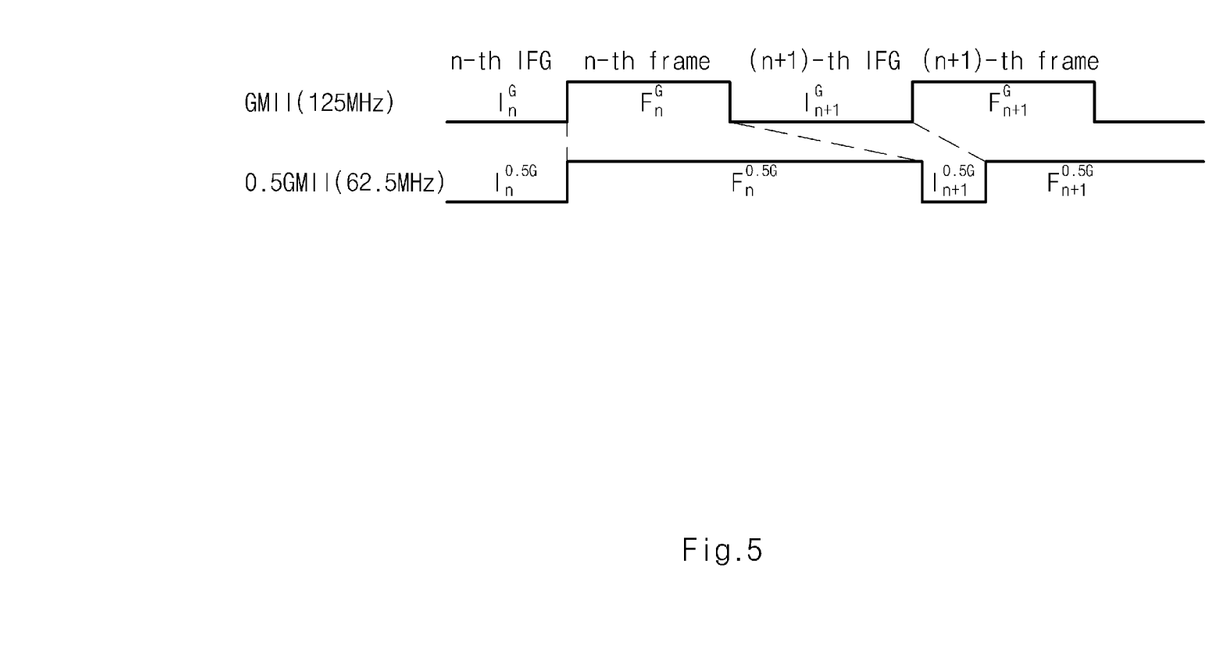
FIG. 5 is another diagram illustrating a process of mapping TX_EN (transmit enable) of GMII to 0.5 GMII, according to an exemplary embodiment.

In FIGS. 3, 4, and 5, $F_n^G$ represents a time interval of an n-th frame, $I_n^G$ represents a time interval of the inter frame gap (IFG) included in the n-th frame, $F_n^{0.5G}$ represents a time interval of the corresponding frame when the n-th frame is transmitted at the 0.5 GMII, and $I_n^{0.5G}$ represents a time interval of the IFG included in the corresponding frame. In this case, a unit is equal to a byte time.

The lengths of the frames are the same when looking at a byte unit, but since the GMII is operated at 125 MHz and the 0.5 GMII is operated at 62.5 MHz, the frame time in the 0.5 GMII is two times as long as the frame time in the GMII. In particular, when T(x) is defined by a function representing an absolute time with respect to a byte time x, the T(x) satisfies the following Equation 1.

$$T(F_n^{0.5G}) = 2T(F_n^G)$$ [Equation 1]

Therefore, the T(x) is equal to the IFG period in the GMII, but the n-th frame is transmitted in the 0.5 GMII.

The dependence of the function of the controller 13 with respect to the length of the IFG included in an n+1-th frame following the n-th frame will be described below.

First, as illustrated in FIG. 3, the case in which the length of the IFG included in the n+1-th frame is $I_{n+1}^G > F_n^G + 24$ (where, 24 refers to the number of clocks) corresponds to the case in which the frame is transmitted at a rate which is less than 500 Mbps, and therefore the n+1-th frame is transmitted without being delayed. In this case, the controller 13 reduces the length (byte number) of the IFG within a $I_{n+1}^{0.5G} > 12$ range in order to satisfy $I_{n+1}^{0.5G} = I_{n+1}^G - F_n^G$, thereby improving link efficiency.

Next, as illustrated in FIG. 4, the case in which the length of the IFG included in the n+1-th frame is $I_{n+1}^G = F_n^G + 24$ corresponds to the case in which the frame is transmitted at a data rate of 500 Mbps, and therefore the TX_EN of the n+1-th frame may be generated without being delayed. In particular, because a transmission start point of the n+1-th frame of the GMII exactly coincides with a transmission start point of the n+1-th frame of the 0.5 GMII, the n+1-th frame may be immediately transmitted without being delayed. In this case, the controller 13 sets the length of the IFG to a minimum length, $I_{n+1}^{0.5G} = 12$.

Next, as illustrated in FIG. 5, the case in which the length of the IFG included in the n+1-th frame is $I_{n+1}^G < F_n^G + 24$ corresponds to the case in which the frame is transmitted at a data rate which exceeds 500 Mbps, and therefore the n+1-th frame needs to be buffered, and the TX_EN is generated after being delayed. The reason is that the n+1-th frame is generated in the GMII before the n-th frame is completely transmitted in the 0.5 GMII. In this case, the controller 13 sets the length of the IFG to a minimum length, $I_{n+1}^{0.5G} = 12$.

The continuous generation of the process causes the frame to be input at 500 Mbps or more in the GMII. Even though the transmission rate of the frame instantly exceeds 500 Mbps, when the frame is input at 500 Mbps on average, it is possible to prevent frame loss by sufficiently securing the length of the transmit buffer 11. However, when the transmission rate of the frame continuously exceeds 500 Mbps, a considerable amount of frame loss occurs. Therefore, a scheme for preventing such a frame loss is needed.

To prevent the frame loss, the controller 13 performs a flow control (FC). As described above, when the frames are continuously input at a rate of 500 Mbps or more while maintaining the minimum IFG via the GMII, the frame loss occurs regardless of the length of the transmit buffer 11. Therefore, the controller 13 transmits the pause frame to the transmission side so as to cause a stoppage in the transmission of the frame when the length of the transmit buffer 11 is filled to some degree.

The flow control is a part of a 802.3x standard. This flow control causes "back pressure" on a network and thereby prevents a traffic overload from being applied to a port. When transmitting the pause frame, a destination Media Access Control (MAC) address is reserved to use 01-80-C2-00-00-01. Further, an operational code for MAC control is 0x0001. A period in which the transmission pause is requested may be set to any value with the range of 0 to 65,535 in a bit time unit.

An architecture of the S & S sub-layer 30 will be described in more detail with reference to FIG. 6.

Figure 6:
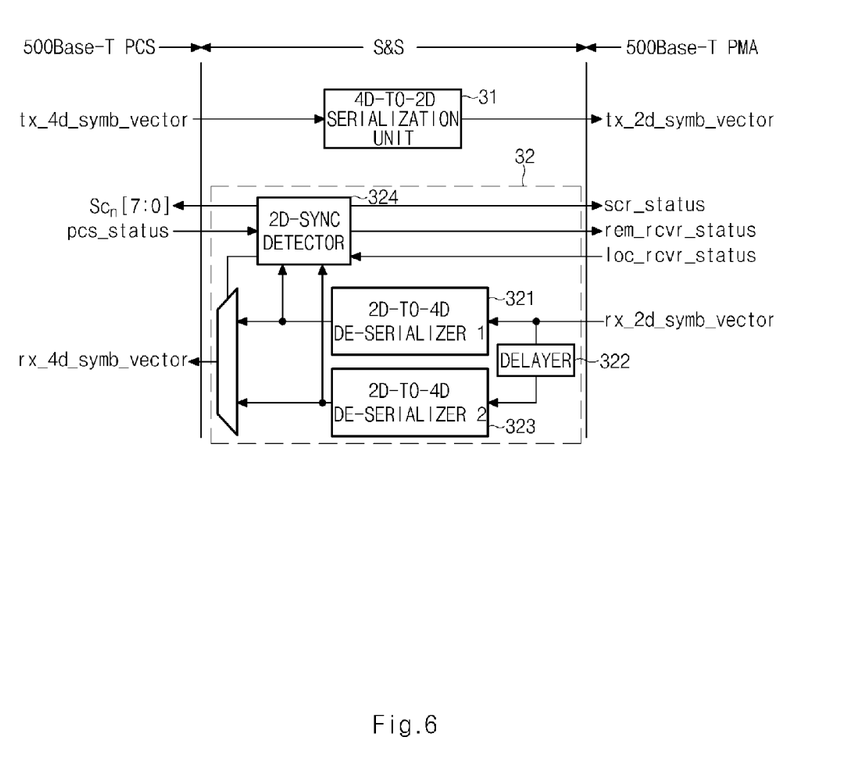
FIG. 6 is a configuration diagram illustrating a S & S sub-layer, according to an exemplary embodiment.

As illustrated in FIG. 6, the S & S sub-layer 30 according to an exemplary embodiment includes the 4D-to-2D serializer 31 and the 2D-to-4D de-serializer 32.

First, the 4D-to-2D serializer 31 serializes $A_n$ and $B_n$ from among the four symbol vectors $A_n$, $B_n$, $C_n$, and $D_n$ into $P_n$, and serializes $C_n$ and $D_n$ into $Q_n$.

The 2D-to-4D de-serializer 32 needs to recover $P_n$ and $Q_n$ which are received from the PMA receiver 42 to $A_n$ and $B_n$ and $C_n$ and $D_n$. Therefore, it is very important to search for the synchronization of the symbol vector. In particular, there is a need to identify whether the symbol input at any instant in the Pn is $A_n$ and $B_n$. Similarly, there is a need to identify whether the symbol input at any instant in the $Q_n$ is $C_n$ and $B_n$.

To this end, the 2D-to-4D de-serializer 32 includes a first 2D-to-4D de-serializer component 321, a delayer 322, a second 2D-to-4D de-serializer component 323, and a 2D-sync detector 324.

The first 2D-to-4D de-serializer component 321 de-serializes the two symbol vectors which are received from the PMA receiver 42 into the four symbol vectors.

The delayer 322 delays the two symbol vectors which are received from the PMA receiver 42 by one clock interval.

The second 2D-to-4D de-serializer component 323 de-serializes the two symbol vectors which have been delayed by one clock interval by the delayer 322 into the four symbol vectors.

The 2D-sync detector 324 detects synchronization by using the idle symbol vector which is transmitted during the IFG period. In this case, the 2D-sync detector 324 detects the synchronization during the IFG period in which the idle symbol vector is received, rather than during the frame (data) period.

Each symbol in the frame period may have any value from among voltage values of $\{+2, +1, 0, -1, -2\}$, but the idle symbol vector has only one of the voltage values of $\{0, -2\}$.

Therefore, the idle symbol vector has a pattern in which a changing order of voltages is constant.

Consequently, the 2D-sync detector 324 detects the synchronization based on the voltage pattern of the idle symbol vector which is transmitted during the IFG period.

In particular, the 2D-sync detector 324 transmits the symbols which are output from the first 2D-to-4D de-serializer component 321 to the PCS receiver 22 when the symbols which are output from the first 2D-to-4D de-serializer component 321 are synchronized, and transmits the symbols which are output from the second 2D-to-4D de-serializer component 323 to the PCS receiver 22 when the symbols which are output from the first 2D-to-4D de-serializer component 321 are not synchronized. In this case, one of the symbol which is output from the first 2D-to-4D de-serializer component 321 and the symbol which is output from the second 2D-to-4D de-serializer component 323 is necessarily synchronized.

For example, when a sequence of the symbols which sequence is output from the first 2D-to-4D de-serializer component 321 is equal to $A_n, B_n, A_n+1, B_n+1, \ldots$ (i.e., the sequence satisfies the voltage pattern of the idle symbol vector), the symbols are in the exactly synchronized state. In this case, the sequence of the symbols which sequence is delayed by one clock interval by the delayer 322 is equal to $B_n, A_n+1, B_n+1, A_n+2, \ldots$.

As another example, when the sequence of the symbols which sequence is output from the first 2D-to-4D de-serializer component 321 is equal to $B_n, A_n+1, B_n+1, A_n+2, \ldots$ (i.e., the sequence does not satisfy the voltage pattern of the idle symbol vector), the symbols are in the asynchronized state. In this case, the sequence of the symbols which sequence is delayed by one clock interval by the delayer 322 is equal to $A_n+1, B_n+1, A_n+2, B_n+2, \ldots$. Therefore, the 2D sync detector 324 transmits the symbols which are output from the second 2D-to-4D de-serializer component 323 to the PCS receiver 22, because the symbols which are output from the second 2D-to-4D de-serializer component 323 are synchronized.

Similarly, the Qn sequence is also subjected to the same process.

Figure 7:
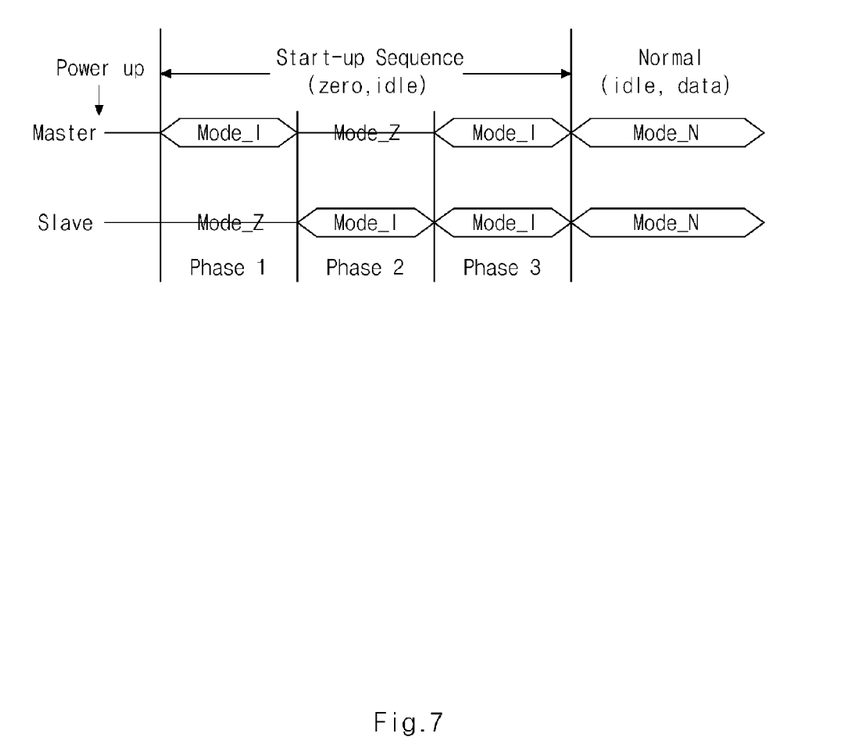
FIG. 7 is a diagram illustrating a start-up sequence, according to an exemplary embodiment.

Further, the 2D sync detector 324 detects synchronization by using the idle symbol vector (i.e., the idle signal) even in the start-up sequence, thereby performing the initial synchronization sequence.

FIG. 7 is a diagram of a start-up sequence according to an exemplary embodiment.

First, when a power supply is turned on, a general auto-negotiation process is performed.

Next, during Phase 1, a master is operated in Mode__1 in order to transmit the idle signal, and a slave maintains Mode_Z. In this phase, the master collects an operation of an echo canceller and a crosstalk canceller, and the slave stabilizes an operation of a filter and an equalizer. This is the same as the start-up sequence of the 1000BASE-T.

In this case, the slave performs the synchronization process by using the idle signal from the master.

Next, during Phase 2, the roles of the master and the slave are swapped as compared with the corresponding roles during Phase 1. In this case, the master performs the synchronization process by using the idle signal from the slave.

Next, during Phase 3, both of the master and the slave are operated in the Mode__1 in order to perform the process of acquiring timing and phase synchronization.

When the start-up sequence is completed, the master and the slave are rushed into Mode_N, which is a normal operation mode.

The exemplary embodiments described above may be variously substituted, altered, and modified by those skilled in the art without departing from the scope and sprit of the inventive concept. Therefore, the inventive concept is not limited to the above-mentioned exemplary embodiments and the accompanying drawings.

One or more exemplary embodiments can be applied to a system which provides the 500 megabits-per-second service via the 2P UTP cable.

The invention claimed is:

1. A 500 megabits-per-second (Mbps) transmission apparatus for use in conjunction with a two pairs (2P) line, comprising:
   a rate matcher which is configured to match rates of transmission data by mapping transmission data which is received from a gigabit media independent interface (GMII) to a 0.5 GMII;
   a data converter which is configured to generate four symbol vectors by using the transmission data for which the rates are matched, and to generate reception data by using four symbol vectors which have been parallelized by a symbol vector processor;
   the symbol vector processor which is configured to serialize the four symbol vectors generated by the data converter into two symbol vectors and to de-serialize two symbol vectors received from a transceiver into the four symbol vectors; and
   the transceiver which is configured to transmit the two symbol vectors serialized by the symbol vector processor to a hybrid circuit and to transmit two symbol vectors received from the hybrid circuit to the symbol vector processor.

2. The 500 Mbps transmission apparatus of claim 1, wherein the rate matcher includes:
   a transmit buffer which is configured to store the transmission data received from the GMII;
   a receive buffer which is configured to store the reception data generated by the data converter; and a controller which is configured to match the rates of the GMII and the 0.5 GMII by using the transmit buffer and the receive buffer.

3. The 500 Mbps transmission apparatus of claim 2, wherein the controller is further configured to use a clock at a 125 megahertz (MHz) rate for storing the transmission data in the transmit buffer and to use a clock at a 62.5 MHz rate for transmitting the transmission data from the transmit buffer in order to reduce a 1 gigabits-per-second (Gbps) data rate to a 500 Mbps data rate.

4. The 500 Mbps transmission apparatus of claim 2, wherein the controller is further configured to control a length of an inter frame group (IFG) at a time of mapping the transmission data between the GMII and the 0.5 GMII.

5. The 500 Mbps transmission apparatus of claim 4, wherein the controller is further configured to transmit a pause frame for requesting a pause of data transmission to a transmission side when an amount of extra space which exists in the transmit buffer exceeds a threshold value.

6. The 500 Mbps transmission apparatus of claim 1, wherein the symbol vector processor includes:
    a 4 dimensional-to-2 dimensional (4D-to-2D) serializer which is configured to serialize the four symbol vectors generated by the data converter into the two symbol vectors; and
    a 2 dimensional-to-4 dimensional (2D-to-4D) de-serializer which is configured to de-serialize the two symbol vectors received from the transceiver into the four symbol vectors.

7. The 500 Mbps transmission apparatus of claim 6, wherein the 2D-to-4D de-serializer includes:
    a first 2D-to-4D de-serializer component which is configured to de-serialize the two symbol vectors received from the transceiver into the four symbol vectors;
    a synchronous buffer which is configured to delay the two symbol vectors received from the transceiver by one clock interval and to store the delayed two symbol vectors;
    a second 2D-to-4D de-serializer component which is configured to de-serialize the stored two symbol vectors into the four symbol vectors; and
    a 2D-sync detector which is configured to detect synchronization by using an idle symbol vector in a length of an inter frame group (IFG) period.

8. The 500 Mbps transmission apparatus of claim 7, wherein the 2D-sync detector is further configured to detect synchronization based on a voltage pattern of the idle symbol vector.

9. The 500 Mbps transmission apparatus of claim 7, wherein the 2D-sync detector is further configured to transmit symbols output from the second 2D-to-4D de-serializer component to the data converter when symbols output from the first 2D-to-4D de-serializer component are not synchronized, and to transmit symbols output from the first 2D-to-4D de-serializer component to the data converter when symbols output from the second 2D-to-4D de-serializer component are not synchronized.

10. A method for using a 500 megabits-per-second (Mbps) transmission apparatus in conjunction with a two pairs (2P) line, comprising:
    mapping transmission data which is received from a gigabit media independent interface (GMII) to a 0.5 GMII;
    generating four symbol vectors by using the transmission data for which the rates are matched;
    serializing the generated four symbol vectors into two symbol vectors; and
    transmitting the serialized two symbol vectors to a hybrid circuit, and receiving the two symbol vectors from the hybrid circuit;
    de-serializing the received two symbol vectors into the four symbol vectors; and
    generating reception data by using the de-serialized four symbol vectors; and
    matching the rate of the transmission data with the rate of the generated reception data.

11. The method of claim 10, wherein the matching includes:
    storing the transmission data received from the GMII;
    storing the reception data generated by using the de-serialized four symbol vectors; and
    matching the rates of the GMII and the 0.5 GMII by using the stored transmission data and the stored reception data.

12. The method of claim 11, wherein the storing the transmission data comprises using a clock at a 125 megahertz (MHz), rate for storing the transmission data and the mapping the transmission data comprises using a clock at a 62.5 MHz rate for transmitting the transmission data in order to reduce a 1 gigabits-per-second (Gbps) data rate to a 500 Mbps data rate.

13. The method of claim 11, further comprising controlling a length of an inter frame group (IFG) at a time of mapping the transmission data between the GMII and the 0.5 GMII.

14. The method of claim 13, further comprising transmitting a pause frame for requesting a pause of data transmission to a transmission side when an amount of extra space which exists in a transmission buffer exceeds a threshold value.

* * * * *